United States Patent
Wigren et al.

(10) Patent No.: US 8,289,206 B2
(45) Date of Patent: Oct. 16, 2012

(54) ACCURACY ASSESSMENT IN ASSISTED GPS POSITIONING

(75) Inventors: Karl Torbjörn Wigren, Uppsala (SE); Ari Kangas, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 954 days.

(21) Appl. No.: 12/279,807

(22) PCT Filed: Feb. 15, 2006

(86) PCT No.: PCT/SE2006/000210
§ 371 (c)(1),
(2), (4) Date: Aug. 18, 2008

(87) PCT Pub. No.: WO2007/094708
PCT Pub. Date: Aug. 23, 2007

(65) Prior Publication Data
US 2008/0316091 A1    Dec. 25, 2008

(51) Int. Cl.
*G01S 19/25* (2010.01)
*G01S 19/06* (2010.01)
*G01S 19/09* (2010.01)

(52) U.S. Cl. .......... 342/357.64; 342/357.43; 342/357.46

(58) Field of Classification Search .. 342/357.2–357.78, 342/357.64, 357.43, 357.46, 463–464; 455/456.1
See application file for complete search history.

(56) References Cited

U.S. PATENT DOCUMENTS

| | | | |
|---|---|---|---|
| 6,453,237 B1 * | 9/2002 | Fuchs et al. | 701/485 |
| 6,839,020 B2 * | 1/2005 | Geier et al. | 342/357.64 |
| 7,277,050 B2 * | 10/2007 | Ikeda | 342/357.43 |
| 7,656,350 B2 * | 2/2010 | Abraham | 342/357.29 |

FOREIGN PATENT DOCUMENTS
WO   WO 2006001738   1/2006

* cited by examiner

*Primary Examiner* — Gregory C Issing
*Assistant Examiner* — Nga X Nguyen (57) ABSTRACT

Reliable and efficient search windows are provided by allowing the adaptation of the code search window to be dependent on inaccuracy measures of relations between a cellular frame time and a satellite reference time. This inaccuracy is calculated in a positioning node (21) of the cellular communications system (1), preferably by filtering of measurements received from user equipments. Linear trend Kalman filtering followed by post processing of estimation errors is presently preferred. In order to ensure non-ambiguous interpretation of the received time stamps of received satellite signals (55) provided by user equipments (10), a pseudo propagation delay is computed in both the user equipment (10) and the positioning node (21) based on GPS acquisition assistance data. The GPS time stamp is then defined referring to the determined pseudo propagation delay. In a preferred embodiment, the pseudo propagation delay is assured to be situated within a pre-determined time interval.

25 Claims, 7 Drawing Sheets

Fig. 9 ated measurements, and from dedicated measurements,
ACCURACY ASSESSMENT IN ASSISTED GPS POSITIONING

TECHNICAL FIELD

The present invention relates in general to the field of satellite based positioning, and in particular satellite based positioning assisted by assistance data from a cellular communication system.

BACKGROUND

Positioning or navigation technology has the purpose of determining a geographic position of an object, equipment or a person carrying the equipment. The position is typically given with respect to a specified coordinate system. Such positioning has become more and more interesting in many fields of applications during recent years. One approach to solve the positioning is to use signals emitted from satellites to determine a position. Well-known examples of such systems are the Global Positioning System (GPS) and the coming GALILEO system. The position is given with respect to a specified coordinate system as a triangulation/trilateration based on a plurality of received satellite signals.

Assisted GPS (AGPS) is an enhancement of the GPS system, to facilitate integration of GPS receivers into e.g. mobile terminals of cellular and/or cellular communication systems. The GPS reference receivers attached to a cellular communication system collect assistance data that, when transmitted to GPS receivers in terminals, enhance the performance of the GPS terminal receivers. Additional assistance data is collected from the cellular communication system directly, typically to obtain a rough initial estimate of the position of the terminal together with a corresponding uncertainty of the initial estimate. This position is often given by a so called cell identity positioning step, i.e. the position of the terminal is determined with cell granularity.

Fine time assistance means that the GPS receiver is provided with highly accurate information or data related to a satellite time reference, e.g. the global GPS time, and satellite positions in space. This, in turn, allows upper and lower bounds of a search window for the code phases of signals transmitted from all GPS satellites to be computed for terminals that reside anywhere in a region obtained by an initial, relatively inaccurate positioning step. This follows since the times of transmission of the signals from the GPS satellites are synchronized with extreme precision, and since the orbits of these satellites can be calculated in the cellular communication system using other types of assistance data obtained from e.g. GPS reference receivers.

There are two main sources of errors present in this process. The first is caused by the fact that the initial position of the user equipment is normally not known with better accuracy than the size of the cell to which it is connected. The second main error contribution is caused by the distribution of GPS time to the terminal. Both sources of errors manifest themselves in an uncertainty of the exact location of the code/Doppler search window of the GPS receiver of the user equipment that is used to lock onto the ranging signal of one specific space vehicle (SV). In WO06001738, methods and means for handling the search window uncertainty caused by the initial position uncertainty are disclosed. However, the determination and generation of the exact relation between a satellite reference time, e.g. the GPS Time Of Week (TOW), and the timing of the cellular frame structure is not discussed.

The establishment of the time relation between GPS TOW and the timing of the cellular frame structure can be performed with two main methods. One way is to have dedicated reference GPS receivers in each radio base station that time stamps the cellular frame boundaries of the uplink and downlink connections. However, such solution calls for relatively expensive additional hardware in the radio base stations and have furthermore redundancy drawbacks.

Another approach is to utilize measurements from user equipments of opportunity, or from dedicated measurements, performed in A-GPS capable user equipments. In the case of user equipment based A-GPS, these user equipments establish GPS TOW and can hence perform the time stamping, whereas a more complicated procedure has to be used for user equipment assisted GPS. There, the sought relation is signalled to the positioning node in the network.

The generation of basic measurements resulting in the fine time assistance data is performed by the user equipment, which measures the number of chips to a cellular frame boundary, at a pre-determined GPS time. However, the establishment of GPS time in the user equipment is non-trivial, in particular in user equipment assisted GPS, since there in prior art are ambiguous ways of interpreting the transmitted information.

If the GPS time in some user equipments is established correctly, the results of the measurements are reported to the positioning node. In a WCDMA case, the positioning node is comprised in the RNC and the report takes place over the RRC protocol as a GPS Timing of Cell Frame measurement. The positioning node collects the measurements and establishes the relation between GPS TOW and the cellular frame timing, e.g. the UTRAN frame timing, for each cell of the cellular system. This collection is not trivial either, also due to possibilities for the ambiguous interpretation mentioned above.

When another user equipment is to be positioned making use of AGPS, the positioning node prepares assistance data, and in particular fine time assistance data. The data comprises an expected relation between the cellular frame timing, (e.g. UTRAN timing) and GPS time (TOW). This data is related to a specific pre-determined reference point, preferably located at the center of the cell. The data furthermore comprises expected code phase and Doppler shift at the reference point. The uncertainty of the expected code phase and Doppler imposed by the spatial extension of the cell may also be provided, see e.g. WO06001738. This information is typically encoded by the positioning node e.g. as a recommended search window for each SV, expressed as a search window center point and a search window length. However, the expected code phase and Doppler is also influenced by the mentioned error in the relation between the UTRAN frame timing and the GPS TOW. Without any information about possible or probable uncertainties in that relation, the window for the expected code phase and Doppler to be searched has to be made unnecessarily wide in order to cover all possible cases. This in turn leads to unnecessarily large computational efforts as well as unnecessarily long processing time.

SUMMARY

One problem with prior art satellite based positioning that relies on user equipment based measurements for establishing relations between cellular time and satellite time is that the accuracy of the established relations are substantially unknown for the positioning node. Furthermore, standards of prior art cellular systems open up for ambiguities upon reporting of time stamping of received satellite signals from the user equipments, making the established time relations between the cellular communication network and the satellite system unreliable.

A general object of the present invention is therefore to provide improved methods and arrangements for providing assistance data intended for positioning of user equipments in cellular communication systems, and thereby also to provide improved methods and arrangements for position determination of user equipments in cellular communications systems. A further object of the present invention is to provide methods and arrangements providing more reliable and efficient search windows. Another further object of the present invention is to provide methods and arrangements ensuring non-ambiguous interpretations of time stamps of received satellite signals provided by user equipments.

The above objects are achieved by methods, arrangements, nodes and systems according to the enclosed patent claims. In general words, reliable and efficient search windows are provided by allowing the adaptation of the search window to be additionally dependent on inaccuracy measures of relations between a cellular frame time and a satellite reference time. This inaccuracy is calculated in a positioning node of the cellular communications system, preferably by filtering of measurements received from user equipments. Linear trend Kalman filtering followed by postprocessing of estimation errors is presently preferred. In order to ensure non-ambiguous interpretation of the received time stamps of received satellite signals provided by user equipments, a pseudo propagation delay is computed in both the user equipment and the positioning network node. This computing is based on GPS acquisition assistance data available at both sides. The GPS time stamp is then defined referring to the determined pseudo propagation delay, and may therefore be recreated at the network side in a non-ambiguous manner. In a preferred embodiment, the pseudo propagation delay is assured to be situated within a pre-determined time interval. Such techniques are usable for several purposes, e.g. for refining inaccuracy determination of the relations mentioned above as well as for the actual positioning of a user equipment.

One advantage with the present invention is that more efficient and reliable positioning of user equipments can be achieved, essentially without needs for changes in standards of cellular communication system reports. Another advantage with the present invention is that more efficient and reliable positioning of user equipments can be achieved, essentially without needs for dedicated satellite reference nodes in each base station.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
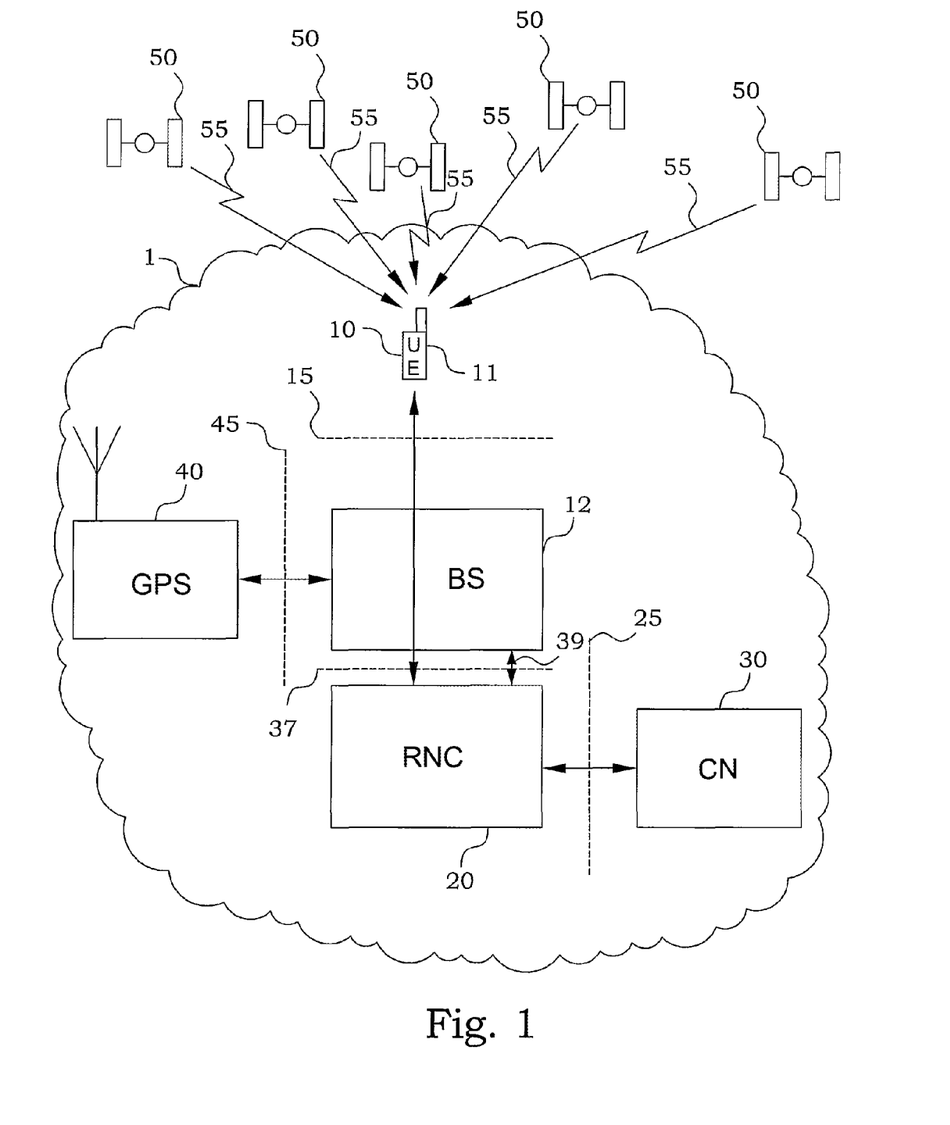
FIG. 1 is a block diagram illustrating an example of A-GPS implemented in a cellular communication system.

FIG. 1 illustrates an example of assisted GPS (A-GPS) implemented in a cellular communication system 1. In this particular example, the cellular communication system 1 is a wideband code division multiple access (WCDMA) system. However, the principles of the present invention are applicable also to other cellular communication systems as well. In this system a radio network controller (RNC) 20 acts as the node that collects refines and distributes assistance data to mobile terminals 10. The mobile terminals 10 are typically denoted as user equipment (UE) in WCDMA context, and the two terms will be used in the present disclosure as synonymous expressions. A core network (CN) 30 requests positioning of a UE over a Radio Access Network Application Part (RANAP) interface 25. In response, the RNC 20 may use different kinds of A-GPS techniques. All these techniques do however build on assistance data being handled by a node, in the present disclosure denoted as positioning node, in the cellular communication system 1. The RNC 20 orders positioning measurements to be performed in the UE 10 via a base station 12 over the Radio Resource Control (RRC) interface 15. These measurements are performed by dedicated A-GPS receiver hardware 11 in the mobile terminals 10. These GPS receivers detect GPS transmissions 55, typically GPS ranging signals, from the satellites 50. The satellites are often denoted as space vehicles (SV) 50.

In a GSM system, the positioning node is typically comprised in a serving mobile location centre (SMLC).

In order to facilitate the measurements of GPS ranging signals, the RNC 20 provides the UE 10 with different types of assistance data. The assistance data may e.g. be acquisition assistance data comprising code phase, integer code phase and the GPS bit number for a list of GPS satellites as expected at a reference site. The assistance data may also comprise fine time assistance data, providing the GPS receiver 11 with highly accurate information related to the global GPS time and satellite positions in space. Such information can be used to calculate individual conditions for a particular GPS receiver 11. The GPS receiver 11 is in such way typically provided with upper and lower bounds for code phases of signals transmitted from the different satellites, when a search for the satellite ranging signals 55 are to be performed.

The RNC 20 may obtain the assistance data in different ways. One approach according to prior art, illustrated in FIG. 1 is that the cellular communication system 1 comprises a reference GPS receiver 40, which is able to detect the satellite ranging signals 55 and thereby directly acquire fine time assistance data transmitted by the SVs 50 as well as the GPS reference time. Assistance data and the GPS reference time can then be provided to the base station 12 over a reference receiver interface 45, allowing the creation of a relation in the base station 12 between the cellular communication system clock and the satellite system clock, i.e. time stamps of the UTRAN frame boundaries of the uplink and downlink connections expressed relative to the GPS time reference. Time stamps or filtered bias drift rates are typically sent 39 over an interface 37 to the RNC 20. This solution is relatively simple in its configuration. However, this solution requires the incorporation of a reference GPS receiver in connection to each RNC 20 in the system, which renders in high additional costs. Furthermore, there are certain redundancy problems.

An alternative solution for obtaining at least the relation between the cellular communication system clock and the satellite system clock is to use UEs 10 of opportunity or from dedicated measurements in A-GPS capable UEs 10. This is not explicitly illustrated in FIG. 1, but the UE 10 can be considered as one of the contributing UEs. In case of UE based A-GPS (discussed more in detail below), the UEs 10 establish the GPS TOW for a certain position of the cellular frame and can hence perform the time stamping, whereas a more complicated procedure for UE assisted A-GPS is disclosed further below. The sought relation then has to be signaled to the positioning node in the network, in WCDMA preferably over the RRC protocol 15.

At this point, it is suitable to mention that there are two types of A-GPS positioning. One type is UE based A-GPS, which performs the positioning calculation in the mobile terminal itself. The other type is UE assisted A-GPS, which performs only the ranging measurements in the terminal. The position is then calculated in a positioning node of the cellular communication system using the code phases measured in the mobile terminal. For UE based A-GPS, the position and the GPS TOW is established in the UE.

Figure 2:
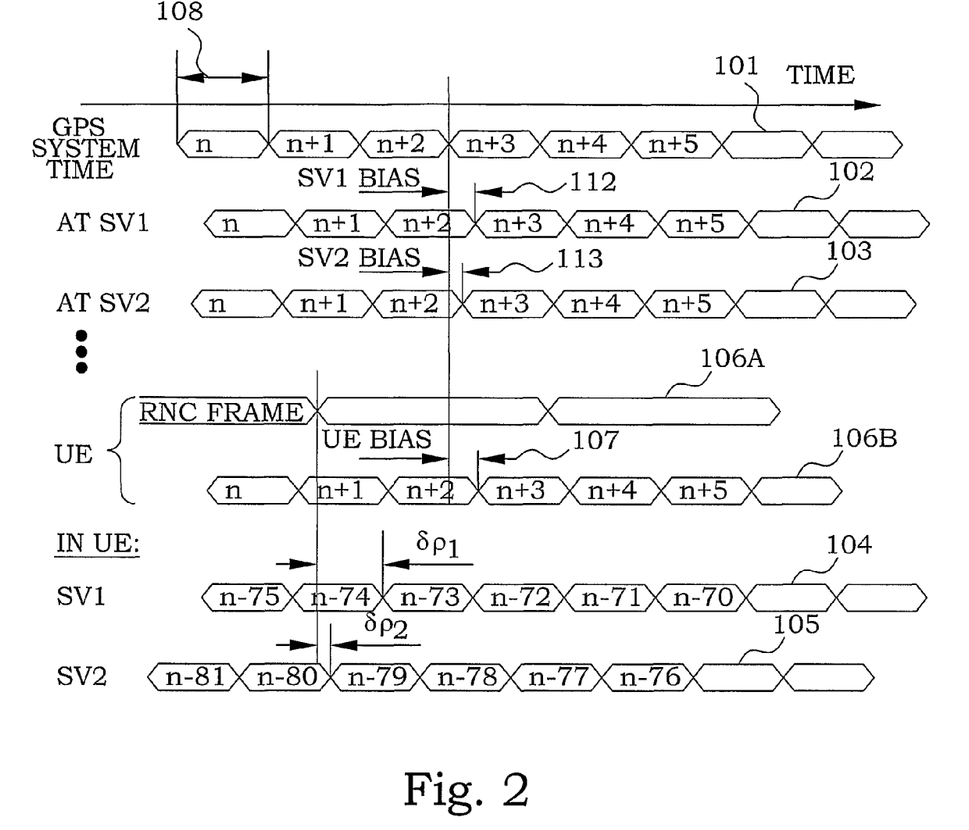
FIG. 2 is a diagram illustrating relations between different system times.

In order to fully understand the problems and the solutions proposed by the present invention, the relations between different system times have to be discussed, preferably in connection to FIG. 2. A first GPS space vehicle (SV) transmit a ranging signal 102 with a spectrum centered at 1575.42 MHz. The signals include a so-called Coarse/Acquisition (C/A) code 108 that is unique for each SV. The C/A code 108 has a length of 1023 chips and a chip duration of $1/1.023\times10^6$ s. The C/A code 108 repeats itself every 1 ms. Superimposed on the C/A code 108 is a navigation data bit stream with a bit period of 20 ms. The navigation data includes among other things a set of so-called ephemeris parameters that enables the receiver to calculate the precise position of the satellites at the time of signal transmission. The SVs carry precise atomic clocks to maintain clock stability.

The SV transmissions are however not perfectly synchronized to a general GPS system time 101. The time axis is directed to the right in FIG. 2. By drawing a vertical line through the timing diagram of FIG. 2, one may therefore obtain a snapshot of all clock readings as observed at various locations in space. The GPS system time 101 is defined as an ensemble average based on a set of ground station clocks and a subset of SV clocks. The individual SV clocks as experienced at the SV location, e.g. the clock of the first SV 102 may be slightly offset compared to the GPS system time, giving rise to a clock bias 112 for the first SV. Another SV 103 has another clock bias 113 etc. A model for the individual offsets is transmitted as part of the navigation message from each SV.

A UE also comprises a clock 106A. This clock 106A is at least to a certain degree synchronized with the cellular communication system clock, e.g. to the RNC frame structure, for enabling exchange of messages uplink and downlink. In case of fine time assistance, the UE clock 106A can also be expressed in terms of GPS system time frames 106B. The clock 106B thus constitutes an estimate of the GPSTOW made in the UE. The relation 107 between corresponding positions of the GPS system time 101 and the UE clock time 106B is the UE clock bias. The relation between a frame time of the cellular communication system and a satellite reference time can e.g. be expressed as the GPSTOW for the start of a particular reference RNC frame.

The clock bias 107 is typically relatively stable, but may exhibit minor drifts, which means that the positioning node of the cellular communication system continuously has to update the relation to the GPS time at least intermittently.

When the signals transmitted from the SVs reach a UE on the surface of the earth, they have been delayed with an amount depending on the range from the SV in question to the UE. The delay depends on the distance the signals have been traveling and is typically 58-87 ms for a UE located at or near the surface of the earth. The timing of the satellite signals as received by the UE are illustrated in FIG. 2 by the lines 104 and 105 for the first SV and the second SV, respectively.

A stand-alone GPS receiver normally needs to decode the complete navigation data stream before the receiver location can be calculated. This may take quite a long time, since e.g. the above mentioned ephemeris and clock correction parameters are only sent once every 30 s. For some applications this delay may be unacceptably large, e.g. for emergency call applications. Furthermore, the decoding requires a certain minimum signal strength to be successful. The receiver can determine the boundaries of the C/A code at much lower signal strength than that required to decode the navigation messages. Therefore so-called Assisted GPS methods were developed, wherein the aforementioned ephemeris and clock correction parameters are sent as assistance data on a faster and more reliable communication link, e.g. a cellular communication link.

The assistance data typically also include an approximate GPS system time and the approximate location of the UE. Depending on the mode of operation, the UE may instead receive a set of parameters that enables the receiver to faster determine the C/A code boundaries. In the latter case, the position is calculated outside the UE in a network positioning node and the UE only provides the measurement of the relative position of the C/A code boundaries.

The fundamental task of an A-GPS receiver is to measure the pseudorange to a number of satellites. The pseudorange for a first satellite is defined as:

$$\rho_1 = c \cdot (t_u - t_{t1}) \quad (1)$$

where $t_u$ is the UE clock reading 106B at the time of reception, and $t_{t1}$ is the time of signal transmission from the first SV 104 of the signal portion received at the UE at time $t_u$. The pseudorange differs from true range with a number of perturbing factors (receiver clock bias, ionospheric and tropospheric delays, SV clock bias, measurement errors etc.) For the purpose of clarity, in this discussion, the influence of most of these error sources will be neglected. There are known techniques to compensate for many of the above listed error sources, see e.g. [1].

The simplified model is that the measured pseudorange obeys:

$$\rho_l = |x_u - x_{s1}(t_{t1})| + b + e_1. \quad (2)$$

Here $x_u = (x_u, y_u, z_u)$ is a row vector containing the three-dimensional coordinates of the unknown receiver location. Similarly $x_{s1}$ is the row vector containing the coordinates of the first SV at time of transmission $t_{t1}$. The SV moves at a speed of 3.84 km/s so the transmission times need to be known at the millisecond level unless the location accuracy will be degraded. The notation |z| means the norm of the vector quantity within brackets, which is equal to $|z|=(zz^T)^{1/2}$. In this case it can be interpreted as the distance between the receiver and the SV. Furthermore b is the receiver clock bias 107 (expressed as a range):

$$b = c \cdot (t_u - t_{GPS}) \qquad (3)$$

where $t_{GPS}$ stands for GPS system time. Finally $e_1$ is the measurement error.

The fine time assistance data allows GPS receivers to obtain the best sensitivity possible with A-GPS. To understand the benefits, it should be mentioned that GPS is a code division multiple access (CDMA) system. The GPS signal from each satellite is hence associated with a specific code. The chip rate of this code is 1.023 MHz for the civil coarse acquisition (C/A) signal. The signal from each satellite is retrieved by correlation against the unique code of each satellite. This code has a duration of 1023 chips, which adds up to exactly 1 millisecond. A further complication is that a 50 Hz bit PSK-modulated stream is superimposed on the GPS ranging signal from the satellites comprising e.g. the ephemeris data. Due to the PSK modulation, the bit edges may complicate ranging correlations since the unknown switches of sign at the bit edges deteriorate correlation receiver performance in case the exact time instances of the bit edges are not known. Until accurate synchronization to GPS time has been established in the GPS receiver, coherent correlation over more than 10 milliseconds is hence not possible. This fact reduces performance significantly when the very first satellite is acquired if no external synchronization information is available. The acquisition of remaining satellites do not suffer from this sensitivity loss since they can exploit the exact synchronization to GPS time obtained as a consequence of the detection of the first satellite.

To conclude, the first and most important benefit of fine time assistance is that it allows the A-GPS receiver to apply coherent correlation detection also for the first satellite it acquires. The 5-10 dB sensitivity gain that may be obtained is believed to be crucial to obtain consistent indoor coverage of A-GPS. The reason is that deep indoor, all satellites can be assumed to be equally weak. No single satellite is easier to detect than the remaining ones.

GPS correlation receivers search a two-dimensional code and Doppler space due to the large variation of the relative speeds of the satellites. One advantage associated with fine time assistance is that it allows the correlation search window to be reduced in the code dimension. This benefit is going to be explained further in connection with FIG. 3. A cell 2 is served by a radio base station (RBS) 12. A reference site 5, preferably in the centre of the cell 2 is defined. Fine time assistance data relating to the reference site 2 is transferred 13 to different UEs 10A-B within the cell. Satellite ranging signals 55 are received at the UEs 10A-B. A specified time instant of the satellite signal 55 is to be detected by correlation to the C/A signal. However, dependent on the actual position of the UE, the detection time will differ. When a certain portion 124 of the satellite signal 55 is received in e.g. a UE 10A situated at the reference site, a UE 10B situated closer to the boundary of the cell will have to wait a time 122 until the corresponding satellite signal portion 124 is received. Coherent correlation has to be performed over such large portions of the satellite signal that these spatial differences will be covered. A search window has thus to be adapted accordingly.

Figure 3:
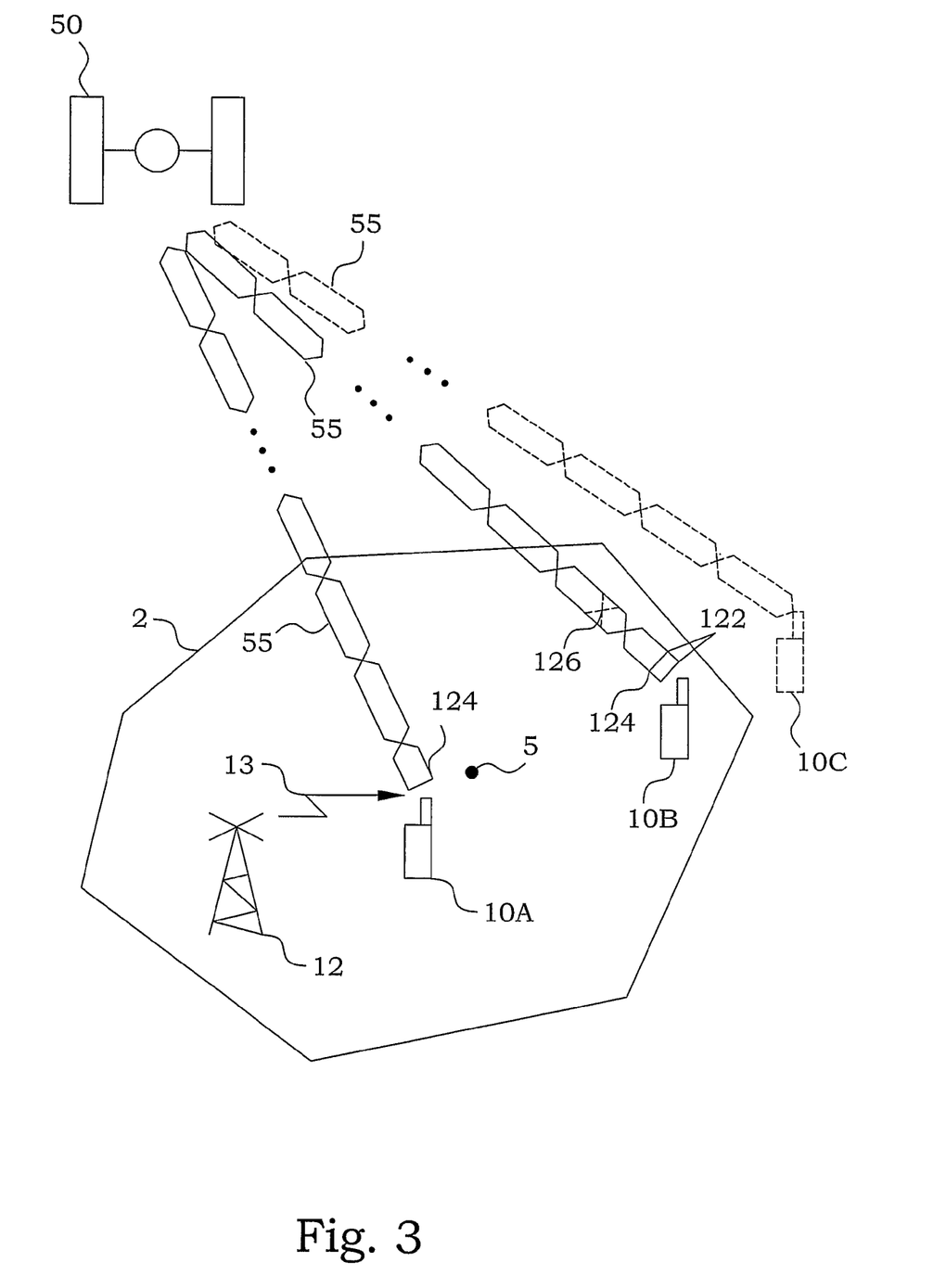
FIG. 3 is a schematic drawing of a cell in a cellular communication system illustrating relations between position, synchronization and propagation delays.

However, if also the GPS synchronization has a certain uncertainty, also this will influence the size of the necessary search window. If an error is present in the relation to the GPS system time data, the occurrence of the portion 124 of the satellite signal 55 may appear as if it was detected at a later instant. This is illustrated as an offset of the frame boundary 126. The detection of UE 10B may then correspond to a UE 10C having a correct synchronization but being positioned even outside the cell 2. An uncertainty in the synchronization between the UTRAN and the GPS systems will thus add to the uncertainty introduced by the spatial uncertainty.

In order to adapt a search window to cover all alternatives synchronization has to be taken into account. A problem is then that there is presently no information entity in standard cellular control signaling, e.g. over the RRC uplink interface, that could provide the positioning node by appropriate uncertainty measures of the measurements performed by the UEs. One approach could be to define a minimum required performance for the determination of the synchronization, and compensate for that. However, this will always give a search window that is always adapted for the worst case of any UE that could be connected to the cellular communication network. This will not give any efficient adaptation of the search windows, which necessarily reduces the performance. Another approach is to modify the standards, but such work may take long time before agreed on. Furthermore, already existing UEs have to be adapted for such standard changes.

A reduction in the code dimension of more than a factor 10 as compared to the complete 1023 chips code epoch of the GPS ranging signal can be achieved. This results in an additional A-GPS sensitivity improvement since there are less code and Doppler search bins that can result in false alarms of the receiver. This gain is however relatively small. Calculations indicate that it is of the order of 0.1-0.5 dB depending on the assumptions. More importantly, the reduced search window sizes reduce the computational complexity of the GPS receiver proportionally, a fact that translates into the possibility to correlate for longer periods of time to enhance sensitivity, or to reduce the computation time, thereby also reducing the power consumption. The latter benefit may be substantial in cases where the A-GPS receiver is used for tracking purposes during extended periods of time. Note that the benefit of a reduced search window is always present when new and undetected satellites are searched for.

According to what was discussed further above, a UE equipped with an A-GPS receiver can be utilized to determine the clock bias, or more generally a measure of a relation (or synchronization) between a frame time of the cellular communication system and a satellite reference time. Such a measure can in turn be used for calculating by the cellular communication network to establish the time relation between the cellular and satellite frame structures. One aspect of the present invention relates to the establishment of such a time relation. At least a part of the generation of fine time assistance data is performed by the UE, which measures the number of UTRAN chips to an UTRAN frame boundary, at a pre-determined GPS time, known in the UE. Note that establishment of GPS time in the UE is non-trivial, in particular in the UE assisted case. The result of measurement is reported to the positioning node, here the RNC, over the RRC protocol as a GPS timing of cell frame measurement. This is discussed more in detail further below. According to the present invention, the positioning node collects similar measurements from UEs and establishes and tracks the relation between GPS TOW and the UTRAN frame timing, for each cell of the cellular system where A-GPS is supported.

In the next step, when a UE is to be positioned with A-GPS, the positioning node prepares assistance data, and in particular fine time assistance data. This data accounts for the expected (nominal) relation of the UTRAN frame timing in GPS time (TOW), defined at a reference site, preferably in the center of the cell in which the UE is located. Furthermore, it comprises the expected code phase and Doppler at the reference site. Also, the uncertainty of the expected code phase and Doppler imposed by the spatial extension of the cell is provided, preferably according to WO06001738. However, also the uncertainty of the established relation between UTRAN frame timing and GPS TOW is of benefit.

One basic object of the present invention is to avoid the introduction of an information entity carrying measurement uncertainties information about the GPS timing of cell frame measurements of the UE, e.g. over the RRC to the positioning node. Another basic object of the present invention is to avoid the need to specify a minimum performance of the GPS timing of cell frames measurements of the UE. This is achieved by the present invention by the application of a technique in the positioning node that automatically estimates the uncertainty.

According to the present invention the time relation between the GPS system time and the cellular communication system time as well as the uncertainty of that relation are jointly estimated and tracked in the positioning node, i.e. in the cellular communication network. This estimation and tracking is performed in the positioning node alone, leaving specifications and UE implementations unaffected.

Figure 4:
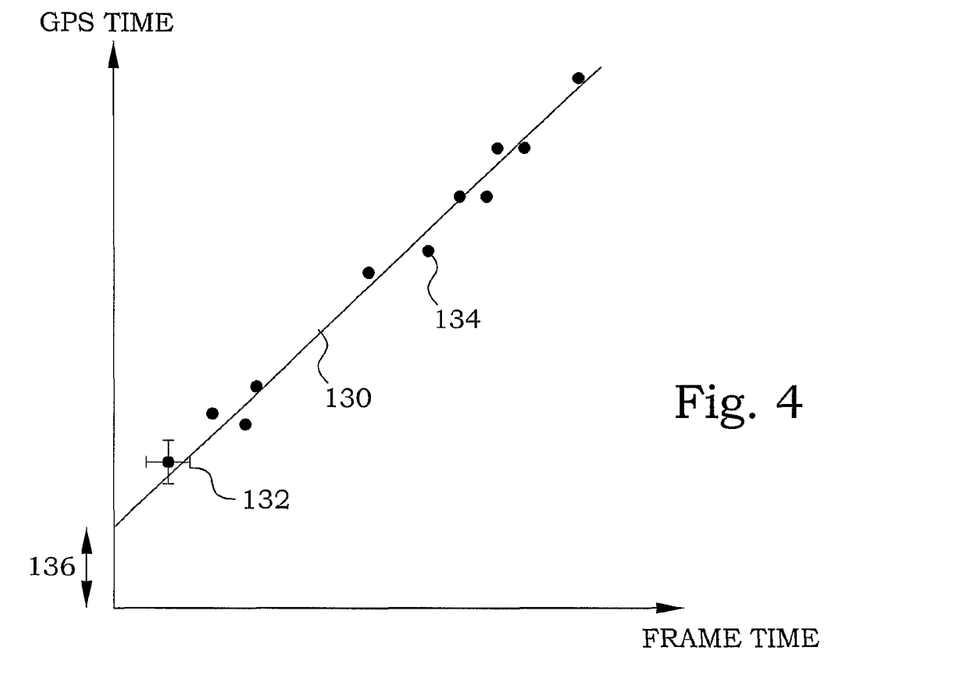
FIG. 4 is a diagram illustrating a relation between cellular communication system frame reference time and satellite reference time.

This can be further illustrated by the diagram in FIG. 4. Relations 130 between GPS time and UTRAN time are measured at a number of occasions, illustrated as points in the diagram. Each measurement 130 of the relation is associated with uncertainties 132, illustrated only for one of the measurements. The value 130 is reported to the positioning node, however, the uncertainties 132 are unknown. According to the present invention, the relations are estimated, preferably by Kalman filtering using a linear trend model. Estimation of the offset 136 as well as the general slope 134 can thereby be achieved. The slope is theoretically equal to 1, but drifts in system clocks may introduce a minor deviation therefrom. This can easily be handled by the Kalman filtering. The offset 136 corresponds to the time relation between the GPS system time and the cellular communication system. The inaccuracy of this measure is also easily obtainable. One way is to utilize a repeated differentiation of data. Another way is to apply a post processing step that is based on the estimation errors obtained by the first estimation step. Standard deviation is one possibility to express the uncertainty. Separate outlier handling is also required, since there may be some UE models that provide poor measurements or that suffers from the problem described further below.

Figure 5:
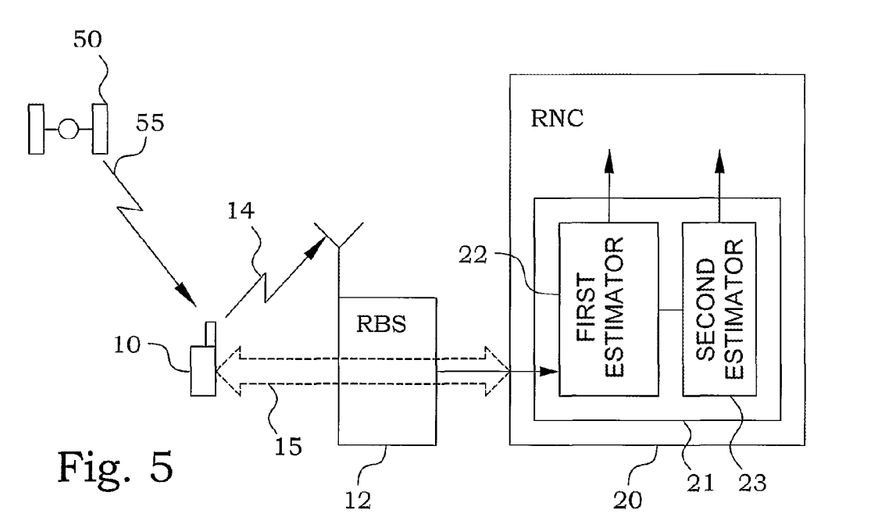
FIG. 5 is a block diagram illustrating an embodiment of a cellular communication system enabling A-GPS positioning of UEs according the present invention.

FIG. 5 illustrates a block diagram of a cellular communications system having such estimation functionality according to the present invention implemented. A number of satellites 50 transmit ranging signals 55, detectable for a UE 10, The UE 10 measures the relation between the GPS system time and the cellular communication system and reports such measurement over the RRC protocol 15 by a UTRAN signal 14 via the RBS 12 to the RNC 20. The RNC comprises a positioning node 21. The positioning node 21 predicts according to the present invention GPS timing of cell frames of a specific cell. A first estimator 22 in the positioning node 21 receives measurement of GPS timing of cell frames and provides estimates of GPS timing of cell frames, e.g. using Kalman filtering based on a drift model. The residuals of the estimation are provided to a second estimator 23 in the positioning node, where estimates of the uncertainty of GPS timing of cell frames are provided. These estimated quantities are then used whenever a UE needs to be positioned.

Figure 6:
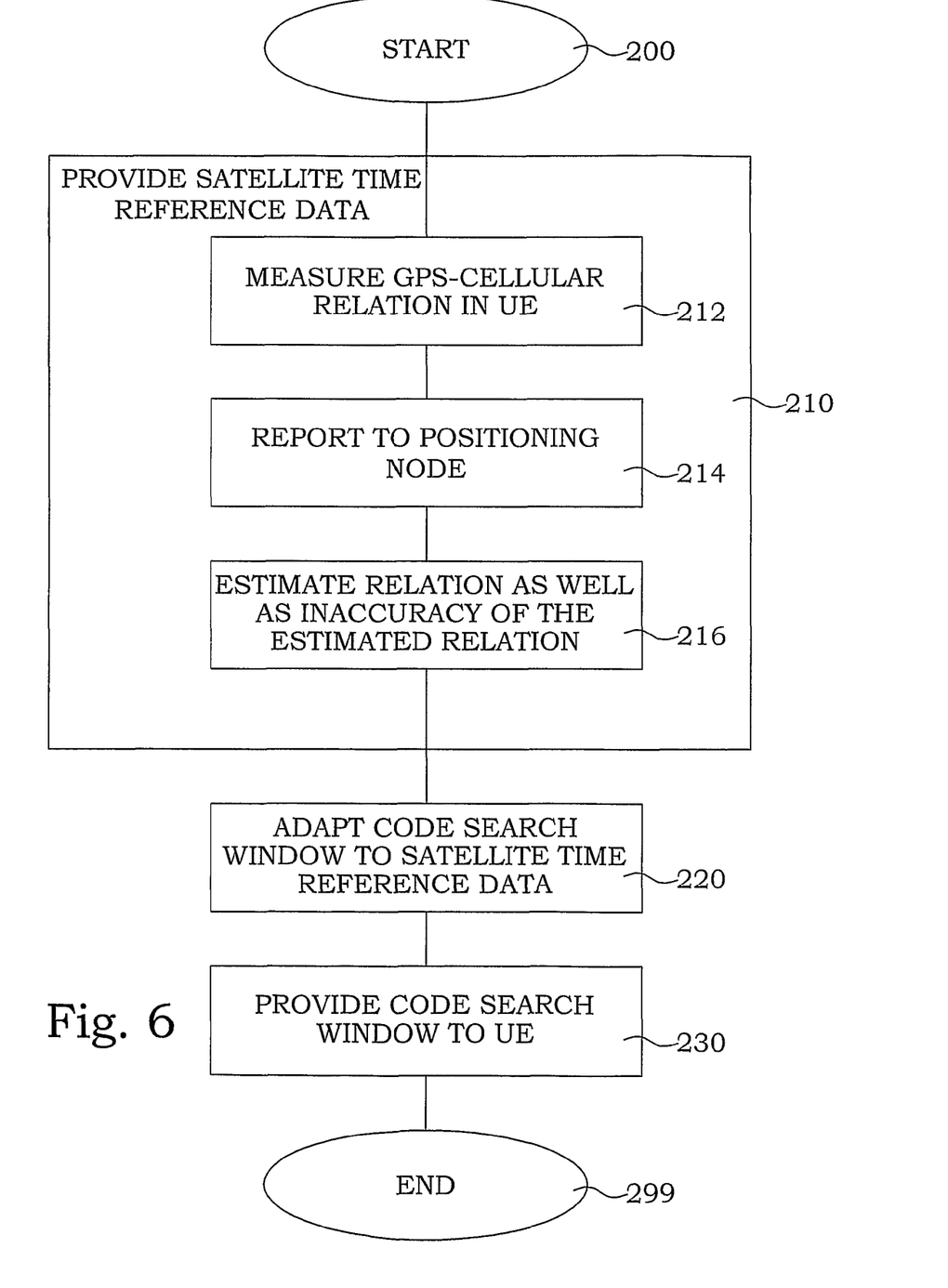
FIG. 6 is a flow diagram of main steps of an embodiment of a method according to the present invention.

A flow diagram of main steps of an embodiment of a method describing the provision of assistance data according to the present invention is illustrated in FIG. 6. The process starts in step 200. In step 210 satellite time reference data is provided. The satellite time reference data comprises at least a relation between a frame time of the cellular communication network and a satellite reference time. This step comprises in turn the substeps 212, 214 and 216. In substep 212 quantities representing the relation is measured in a multitude of mobile terminals over time. The measured quantities are reported from the mobile terminals to the positioning node in step 214. In step 216 calculations are performed. An estimate of the relation between the frame time of the cellular communication network and the satellite reference time is calculated from the reported measured quantities. Furthermore, an inaccuracy of the estimate of the relation is estimated.

In step 220, a search window for a specific satellite is adapted, based in the satellite time reference data, and then in particular at least on the estimated inaccuracy of the estimate of the relation between the frame time of the cellular communication network and the satellite reference time. Finally, in step 230, data representing the adapted search window is provided to a mobile terminal that is to be positioned. The procedure ends in step 299.

In order to give some more details on a preferred embodiment of the filtering process, the following linear trend model can be introduced as one example:

$$\tau(t+T_S)=\tau(t)+T_S\cdot\dot{\tau}(t)+w_\tau(t) \quad (4)$$

$$\tau_{Measurement}(t)=\tau(t)+e_\tau(t) \quad (5)$$

Here $\tau$ is the GPS timing of cell frames value to be estimated, $\dot{\tau}$ the corresponding drift rate and w the model uncertainty, normally modeled as Gaussian white noise. Furthermore $\tau_{Measurement}$ denotes the measurements of GPS timing of frames and e denotes the measurement error of one specific measurement. $T_S$ denotes the measurement rate that can be allowed to be time varying. A time variable Kalman filter can then be designed, see e.g. [2], for estimation of $\tau$ and $\dot{\tau}$, using the measurements $\tau_{Measurement}$. It should be noted that there are several alternatives of varying level of sophistication as to the exact solution of the filtering steps.

The estimation error from this filter can then be used as a basis for estimation of e.g. standard deviation that then forms the sought uncertainty measure.

A less accurate alternative to the above procedure would be to simply numerically differentiate the measurements twice. This would ideally render a measure of the measurement uncertainty of single measurements, that could then be combined in a step similar to the one outlined above.

An additional problem when utilizing UEs for providing measurements of GPS-to-cellular frame relations is also that it is in present standards not perfectly determined how the measures reporting the GPS TOW should be interpreted due to ambiguities introduced by truncation of data. This will also be of importance during UE assisted A-GPS, where GPS timing is provided from the UE to the positioning node.

Figure 7:
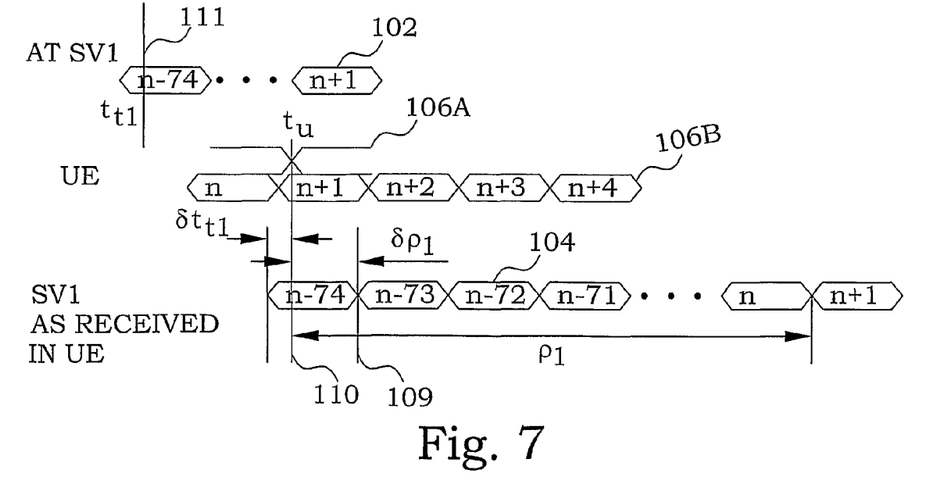
FIG. 7 is a diagram illustrating time relations at reception of a satellite ranging signal in a UE.

FIG. 7 illustrates a time diagram of a detailed example of the determination of a transmission time determination for a received satellite signal. A signal portion is transmitted at a transmission time, $t_{t1}$, 111 from a satellite. The satellite signal portion 104 is received a specific time at the UE 110, $t_u$. If $t_u$ e.g. is defined as a frame boundary of the UE clock time, the corresponding transmission time, $t_{t1}$ is to be determined by using the inherent timing information of the signal. This enables the determining a pseudorange $\rho_1$ by multiplying a difference by the speed of light.

The transmission time $t_{t1}$ is typically determined in several stages. First the submillisecond part of $t_{t1}$ is determined by finding the boundaries of the C/A codes for the SV. This is done using correlators that test all possible code phase and Doppler shifts within a certain search window, as described further above.

In a subsequent step, the millisecond part of the transmission time needs to be estimated. This only needs to be done for first SV to be determined. The complete transmission time of the subsequent SVs may be reconstructed in the RNC by using knowledge of one complete transmission time and apriori knowledge of UE and SV locations. Tentative transmission times differ relative to each other by an integer number of milliseconds. One millisecond corresponds to 300 km. Therefore for most cases, the transmission times would be possible to determine unambiguously if the complete GPS TOW information would be available for the RNC. Thus, if GPS TOW is known, only the number of chips from the latest frame boundary, $\delta t_{ti}$, has to be determined, i.e. the truncated transmission time. From this a truncated pseudorange $\delta \rho_i$ can be provided, using the relation:

$$\delta \rho_i = c \cdot (0.001 - \delta t_{ti}). \quad (6)$$

The estimation of the millisecond part of transmission time requires that the received data is despread, leaving raw navigation data bits. The estimation can then be made by a number of techniques.

A first approach is direct demodulation of TOW. This requires first that bit synchronization at 20 ms level is performed. Then the data is demodulated at a rate of 20 ms. This process normally requires that subframe boundaries are determined followed by decoding the so-called Handover Word, from which the TOW, i.e. the transmission time $t_{t1}$ can be derived. Each subframe has a length of 6 s, so this procedure may require that approximately 8 seconds of navigation data is collected. TOW demodulation works down to approximately −172 dBW, assuming 0 dB antenna gain and is in fact the limiting factor for GPS coverage.

A second approach is TOW estimation using correlation techniques. This procedure also requires that demodulation data bits are generated, but instead of direct decoding, correlation is made with known transmitted navigation data bits. These bits comprises the so-called Telemetry Word and the HOW word which may be sent to the UE as part of the assistance data. This requires that the GPS time is apriori known within a few seconds. This procedure works to somewhat lower signal levels than direct TOW decoding, but most likely the performance is limited by the tracking loops that may loose lock at such low signal levels. Typically phase locked loops or automatic frequency control loops are employed for this. However it is expected that this will work down to around −179 dBW.

A third approach is the use of real time clocks. If TOW has previously been determined, the receiver may be able to maintain an accurate clock at a millisecond level using e.g. the cellular system clocks that typically drift only a few nanoseconds per second and long term stability may be better than 1 ms for a significant amount of time. However, it may be difficult for the user to know the absolute accuracy, which limits the use of this method. Furthermore, this method requires that either of the first or second approaches is performed with some interval.

Whatever method is used, the UE supporting UE assisted A-GPS is subsequently required to compensate for the propagation delay and hence report the approximate GPS system time at time of measurement, c.f. FIG. 7. Note that the UE supporting UE assisted A-GPS normally does not have access to ephemeris data, i.e. the satellite locations, nor does it have knowledge of its approximate location. Therefore it appears to be difficult to compensate for the propagation delay from the SV to the UE. Also, for position calculation it would not have been necessary to perform such compensation. A better alternative would have been to report the estimated transmission time instead. In fact one of the first tasks in the position calculation is to perform a transformation back from estimated GPS system time to the transmission times, since the transmission times are needed for calculating the precise SV locations at the time of transmission. The requirement to estimate GPS system time creates a risk that the reconstruction of the transmission times cannot be done correctly. This then introduces a millisecond ambiguity in the relation GPS/UTRAN time which makes the assistance data less useful or even harmful.

According to one aspect of the of the invention, rules for how the UE shall perform the delay compensation are created, so that the RNC unambiguously can reconstruct the transmission times from the reported GPS system time. Furthermore, the solution requires no change to the various cellular standards.

The UE is provided with the expected Code Phase (CP), Integer Code Phase (ICP) and the GPS Bit Number (GPSBN) for a list of SVs. These "code phase" parameters are hence valid at a specific time and at a particular reference location (c.f. FIG. 3). This common time stamp GPS TOW is also provided. The data is provided in the information element GPS Acquisition Assistance, and the purpose is to enable the UE to reduce the number of code phase shifts in the search for the C/A code. For this particular application it is assumed that the UE does not receive any accurate relation between GPS and cellular time. Indeed, with such a relation available, the UE would not need to reconstruct the TOW at reception. It can therefore be assumed that the UE only knows GPS time within a few seconds. Therefore the above mentioned assistance data fields are useful only once the first SV signal has been acquired.

However, the information elements may surprisingly be used also for the purpose of the present aspect of the present invention, i.e. to accurately estimate the delay from the SV to the UE, typically for the first satellite. The precise definition of the mentioned assistance data elements is as follows:

The Code Phase (CP) field contains code phase, in units of 1 GPS chip, in the range from 0 to 1022 GPS chips. The CP number defines the number of chips that remain to the next C/A code boundary, as seen by a receiver at the reference site at the time of GPS TOW. This CP number is thus analogue to a truncated predicted pseudorange. The reference location would typically be an apriori estimate of the MS location. This field is mandatory. The time resolution is obviously 0.001/1023 s.

The Integer Code Phase (ICP) field contains integer code phase, i.e. the number of the code periods that have elapsed since the latest GPS bit boundary, in units of C/A code period, as seen by a receiver at the reference site at the time of GPS TOW. This field is mandatory. The range is 0-19 and the time resolution is 0.001 s.

The GPS Bit Number (GPSBN) field contains GPS bit number (expressed modulo 4) currently being received at the time GPS TOW, as seen by a receiver at the reference site. This field is mandatory. The range is 0-3 and the time resolution is 0.02 s.

It is obvious from these definitions that they are directly related to the SV time as seen at a reference site at the time GPS TOW. By using the definitions, the transmission time from the first satellite can be derived as:

$$t_{t1,ref} = GPSBN \cdot 0.02 + ICP \cdot 0.001 + (1023 - CP)/1.023 \cdot 10^6,$$
$$CP \neq 0$$

$$t_{t1,ref} = GPSBN \cdot 0.02 + ICP \cdot 0.001, CP=0, \quad (7)$$

expressed in seconds. The delay can thus be expressed as:

$$\tau = t_{u,ref} - t_{t1,ref}. \quad (8)$$

However, note that the transmission time is defined modulo 80 ms, which means that the delay also need to be defined modulo 80 ms. The $t_{u,ref}$, i.e. the GPS TOW as expected at the reference site is also expressed in units of 80 ms, which the results in:

$$\tau = \mathrm{mod}(t_{u,ref} - t_{t1,ref}, 0.08) = \mathrm{mod}(-t_{t1,ref}, 0.08) = 0.08 - t_{t1,ref} \quad (9)$$

One here notices that the information contained by the GPS TOW, $t_{u,ref}$, disappears, which renders the delay $\tau$ expressed in modulo 80 ms an ambiguity. The delay $\tau$ always gives a value between 0 and 80 ms. However, for the actual GPS satellites, the distances to the surface of the earth gives actual delays somewhere in the range of about 58-87 ms.

Figure 8:
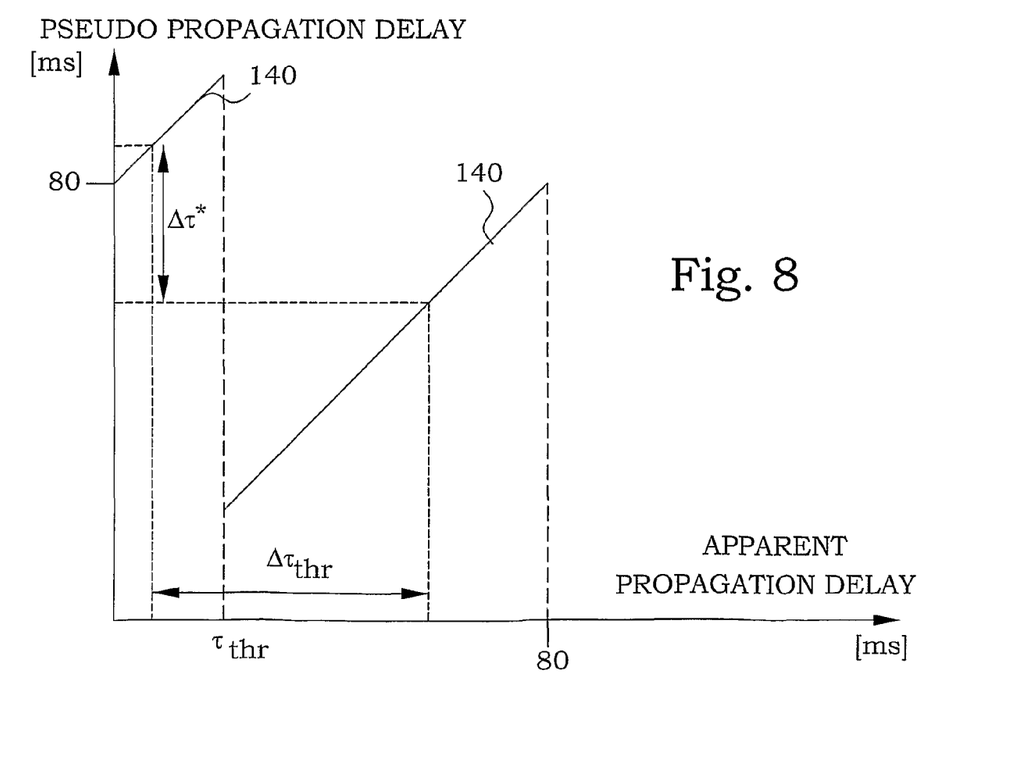
FIG. 8 is a diagram illustrating a preferred embodiment for computing a pseudo propagation delay according to the present invention.

In FIG. 8, these relations are illustrated. At the horizontal axis is the apparent delay, i.e. the delay modulo 80 ms given, and at the vertical axis is a pseudo delay illustrated. This pseudo delay differs from the actual delay due to certain errors and offsets, which can be compensated for in different ways. The pseudo delays are by the satellite configuration known to be situated within a certain interval, $\delta\tau^*$. Apparent delays in the lowest region have to be interpreted as being reduced by 80 ms. Therefore, according to one preferred embodiment of the present invention, all apparent delays below a certain threshold $\tau_{thr}$ should be compensated by adding 80 ms. This gives a relation 140 between the apparent delay $\tau$ and the pseudo delay $\tau^*$. In order to cover the intended pseudo delay range between 58 and 87 ms, the threshold should preferably be selected somewhere in the interval, $\delta\tau_{thr}$, ranging from 7 to 58 ms. To have some safety margins for errors and offsets, and to also include mobile terminals not located exactly at the surface of the earth, the threshold should be selected somewhere in the middle of the interval, $\delta\tau_{thr}$, e.g. in the interval 30 to 45 ms.

If a specific $\tau_{thr}$ value is selected, the pseudo delay can be calculated as:

$$\begin{cases} \tau^* = \tau, & \text{if } \tau > \tau_{thr} \\ \tau^* = \tau + 80 \text{ ms}, & \text{if } \tau \leq \tau_{thr}. \end{cases} \quad (10)$$

The UE can now determine the transmission time $t_{t1}$ from the first satellite as received at the actual location. The pseudo delay is then used to determine the reception time, $t_u$, such that:

$$t_u = t_{t1} + \tau^*. \quad (11)$$

The reception time is then quantized to integer milliseconds, which may be done through a simple truncation, such that $$GPSTOW = \mathrm{floor}\{1000 \cdot t_u\} ms = \mathit{floor}\{1000 \cdot (t_{t1} + \tau^*)\} ms. \quad (12)$$

When the reports are sent to the RNC, also the transmission time $t_{t1}$ is truncated, such that:

$$t_{t1} = k \cdot 10^{-3} + \delta t_{t1}, \quad (13)$$

where $\delta t_{t1}$ is the truncated transmission time, i.e. the sub-millisecond part, and k is an integer. This can also be expressed as a truncated pseudorange through the relation (6) further above. The GPSTOW and the truncated pseudorange are reported to the RNC. In the RNC, the truncated transmission time is easily achieved, and the integer part k may now be reconstructed by inserting (12) into (11) and rearranging it, giving:

$$k = GPSTOW - \mathrm{floor}\{1000 \cdot (\delta t_{t1} + \tau^*)\}. \quad (14)$$

The value of $\tau^*$ is not reported, but since the calculation of it is based only on the assistance data provided from the RNC itself, a corresponding calculation of $\tau^*$ can be performed also at the RNC side. The RNC can now use the reconstructed $t_{t1}$ according to (12) along with the other pseudorange measurements and the RNC system frame number to calculate the UE position, precise GPS system TOW and establish the precise relation between GPS and UTRAN time.

It should be noted that other embodiments of the calculation of $\tau^*$ can be employed, as long as the same calculation is performed at both sides in the cellular communication system, i.e. both at the UE and in the RNC. The calculation therefore has to rely on parameters that are available for both nodes. In the present invention, it was realized that the acquisition assistance data could serve this purpose.

Figure 9:
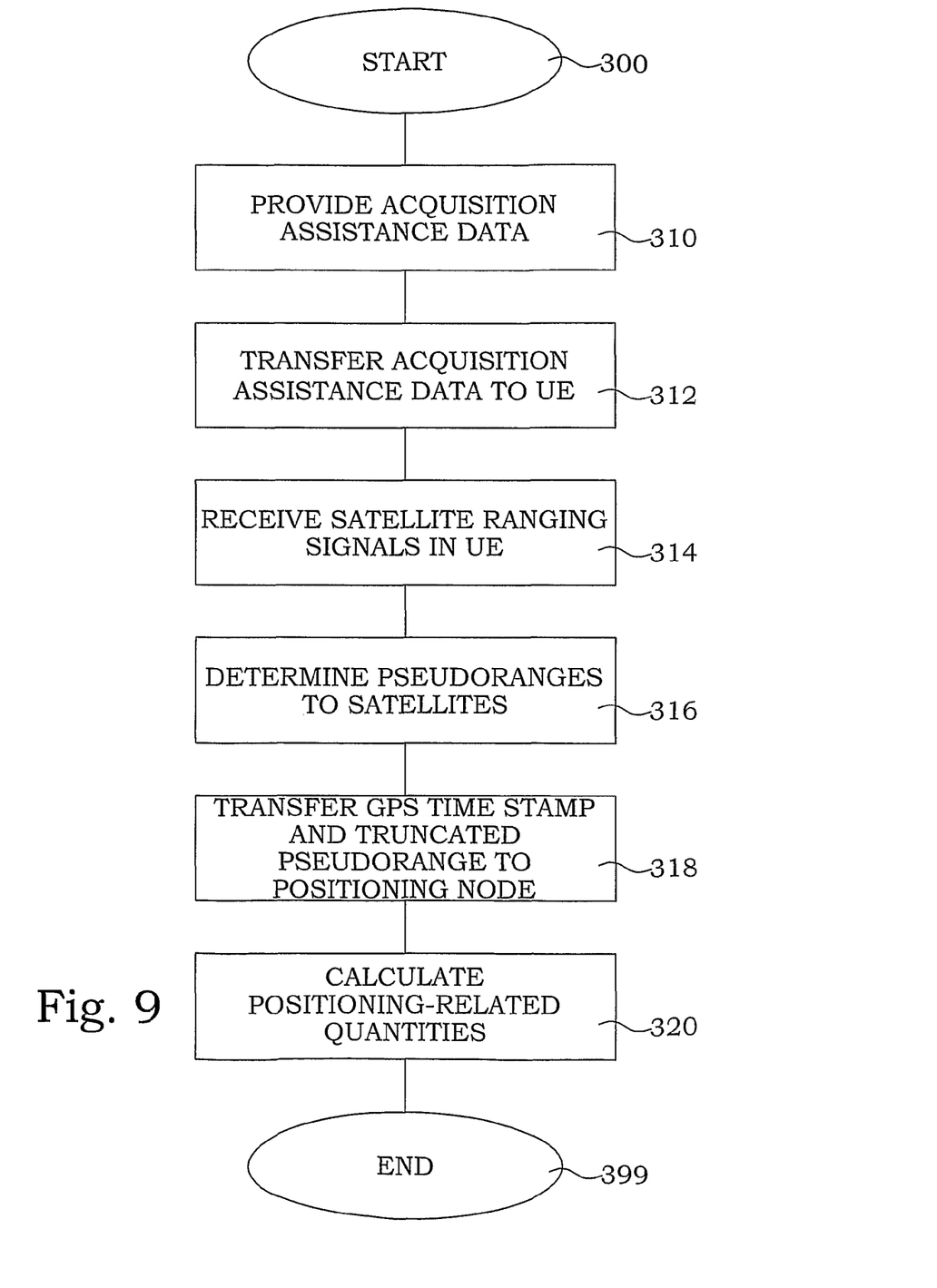
FIG. 9 is a flow diagram of main steps of an embodiment of another method according to the present invention.

FIG. 9 illustrates a flow diagram of main steps of an embodiment of a method according to one aspect of the present invention. The procedure starts in step 300. In step 310, GPS acquisition assistance data is provided. This GPS acquisition assistance data comprises at least code phase, integer code phase and GPS bit number for a list of GPS satellites as expected at a reference site. In step 312, the acquisition assistance data is transferred to a UE. A plurality of satellite ranging signals are received in the UE in step 314. In step 316, a pseudorange to each of said plurality of GPS satellites and a GPS time stamp for the reception of respective signals are determined. This determination includes, for a first satellite to be determined, a computation of a pseudo propagation delay based on the acquisition assistance data is performed. The pseudo propagation delay is then used to determine the GPS time stamp for the reception of the first satellite ranging signal. In step 318, the time stamp and truncated pseudorange are transferred to the positioning node. In case the time stamp is going to be used in a filtering procedure according to e.g. FIG. 6, this GPS time stamp and truncations of pseudoranges are comprised in the reported measured quantities representing the relation between a frame time of the cellular communication system and a satellite reference time. In step 320, a calculation is performed. This calculation step comprises the same computation of a pseudo propagation delay as was performed in the UE. This calculation may be e.g. a filtering procedure according to FIG. 6. The calculation step may also comprise a calculation of a position of the UE based on the transferred GPS time stamp, truncations of pseudoranges as well as on the computed pseudo propagation delay.

Figure 10A:
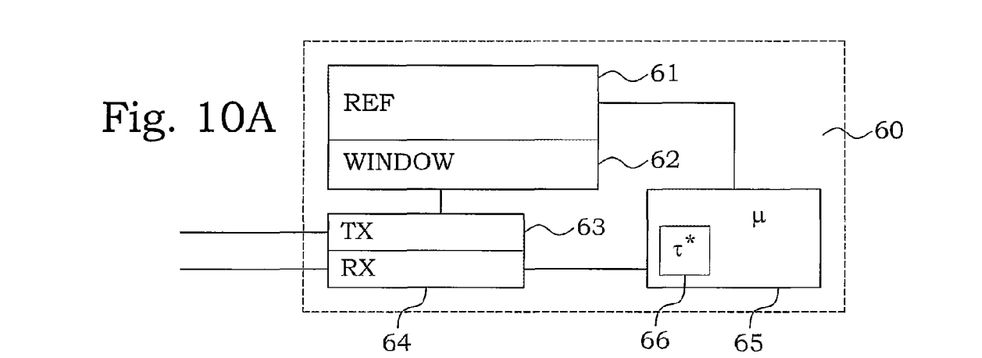
FIG. 10A is a block diagram of main parts of an embodiment of a cellular communication system arrangement according to the present invention.

FIG. 10A illustrates a block diagram of main parts of an embodiment of an arrangement 60 in a cellular communication system related to positioning of UEs. This arrangement 60 is typically comprised in a positioning node 21 of the cellular communication system, e.g. in a RNC 20. However, the arrangement 60 may also be located elsewhere in the cellular communications system and also be configured in a distributed manner, where different functionalities are comprised in different nodes communicating with each other. The arrangement 60 comprises a section for provision of data 61, in particular satellite time reference data and/or GPC acquisition assistance data. The section for provision of data 61 is in the present embodiment connected to a section for adapting 62 limits of a search window for assisting UEs in their search for satellite ranging signals. The section for adapting 62 limits of a search window and the section for provision of data 61 are connected to a transmitter 63, arranged for providing data, e.g. search window limits or acquisition assistance data to a UE, preferably using different control signaling. The arrangement 60 further comprises a receiver 64, for reception of measures quantities representing the relation between a frame time of the cellular communication system and a satellite reference time and/or data representing truncations of a pseudorange between a plurality of satellites and the UE and a GPS time stamp of the reception of these ranging signals. The received data is provided to a processor 65. The processor 65 is in the present embodiment arranged for calculating an estimate of the relation from the received data as well as for calculating an estimated inaccuracy of the estimated relation. These estimates are provided to the section for adapting 62 limits of a search window and the section for provision of data 61 in order to improve the adaptation of the search window.

In the present embodiment, the processor further comprises means for computing 66 a pseudo propagation delay. This pseudo propagation delay can be used in the calculation of the relation and/or for calculations of a position of the UE.

Figure 10B:
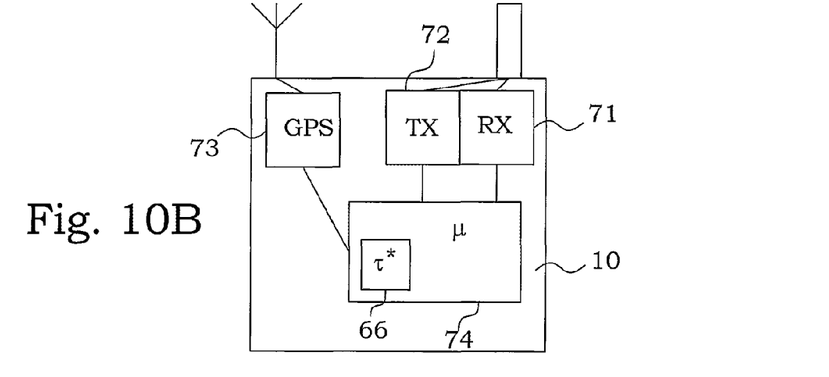
FIG. 10B is a block diagram of main parts of an embodiment of a user equipment according to the present invention.

FIG. 10B illustrated a block diagram of main parts of an embodiment of a user equipment 10 according to the present invention. The UE 10 comprises a receiver 71 and transmitter 72 for control signaling within the cellular communication system. Through the receiver, acquisition assistance data is received and provided to a processor 74. The UE 10 additionally comprises a GPS receiver 73, arranged for allowing reception of satellite ranging signals from a multitude of GPS satellites. The received ranging signals are provided to the processor 74. The processor comprises means for computing 66 a pseudo propagation delay, based on the received acquisition assistance data. The pseudo propagation delay is used by the processor to provide truncated pseudoranges and corresponding GPS time stamps from the received satellite ranging signals. Such truncated pseudoranges and corresponding GPS time stamps are provided to the transmitter 72 for further provision to positioning nodes in the cellular communication system.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] E. D. Kaplan, "Understanding GPS—Principles and Applications", Norwood, Mass., Artech House, 1996, pp. 247-251, 255, 340-343.
[2] T. Söderström, "Discrete-Time Stochastic Systems—Estimation and Control", Prentice Hall, Hemel Hempstead, UK, p. 235.

The invention claimed is:
1. A method for providing assistance data when determining a position of a mobile terminal being connected to a cellular communication system via a base station, comprising the steps of:
   providing satellite time reference data using a positioning node of the cellular communication system, said satellite time reference data comprising a relation between a frame time of said cellular communication system and a satellite reference time;
   using the positioning node, adapting a search window to a specific satellite from which a satellite ranging signal emerges based at least on said satellite time reference data; and,
   using the positioning node, providing said search window to said mobile terminal;
   wherein said step of providing satellite time reference data comprises the steps of:
      the positioning node receiving, from a multitude of mobile terminals over time, measured quantities representing said relation;
      the positioning node calculating an estimate of said relation from said received measured quantities representing said relation, as well as calculating an estimated inaccuracy of said estimate of said relation;
   wherein said step of adapting said search window is based on said estimated relation and said estimated inaccuracy of said estimated relation.

2. The method according to claim 1, wherein said step of calculating comprises Kalman filtering.

3. The method according to claim 2, wherein said Kalman filtering is based on a linear trend model.

4. The method according to claim 2, wherein said step of calculating further comprises the positioning node estimating said inaccuracy from estimation errors of said Kalman filtering.

5. The method according to claim 1, wherein said step of calculating comprises estimation of said inaccuracy from a repeated differentiation of said measured quantities.

6. The method according to claim 1, applied to mobile terminal assisted positioning using the global positioning system - GPS, comprising the further steps of:
   providing, in said positioning node, GPS acquisition assistance data comprising code phase, integer code phase and the GPS bit number for a list of GPS satellites expected at a reference site;
   the positioning node transferring said GPS assistance data to said mobile terminal;
   the mobile terminal receiving signals from a plurality of GPS satellites;
   the mobile terminal determining a pseudorange to each of said plurality of GPS satellites and a GPS time stamp for the reception of respective said signals; and
   the mobile terminal transferring said GPS time stamp and truncations of said pseudoranges to said positioning node;
   whereby said received measured quantities representing said relation comprises said GPS time stamp and truncations of said pseudoranges;
   said step of the mobile terminal determining a GPS time stamp and said step of the positioning node calculating an estimate of said relation both comprising the further step of computing a pseudo propagation delay based on said GPS acquisition assistance data;
   said mobile terminal determining a GPS time stamp for a first of said plurality of GPS satellites based on said pseudorange to said first GPS satellite and said pseudo propagation delay; and
   whereby the positioning node calculates an estimate of said relation based on said pseudo propagation delay and said received measured representation of said relation.

7. The method according to claim 6, wherein said computing of said pseudo propagation delay in turn comprises the steps of:
   determining an apparent propagation delay;
   establishing said pseudo propagation delay as said apparent propagation delay if said apparent propagation delay is larger than a predetermined minimum delay and as said apparent propagation delay plus 80 ms if said apparent propagation delay is smaller than said predetermined minimum delay.

8. The method according to claim 7, wherein said minimum delay is selected in the interval of 7 to 58 ms.

9. The method according to claim 8, wherein said minimum delay is selected in the interval of 30 to 45 ms.

10. The method according to claim 7, wherein said apparent propagation delay, $\tau$, being calculated as:
$t_{t1,ref}$=GPSBN ·0.02 +ICP ·0.001 +(1023−CP) / 1.023·10$^6$, CP $\neq$0
$t_{t1,ref}$=GPSBN ·0.02 +ICP ·0.001, CP =0
expressed in s, where GPSBN is the GPS bit number, ICP is the integer code phase and CP is the code phase for said first of said plurality of satellites;
said GPS time stamp for said first of said plurality of satellites being calculated as:
GPSTOW =floor {1000 * ($t_{t1}$+$\tau$*)}ms,
expressed in ms, where $t_{t1}$ is a transmission time from said first of said plurality of satellites and $\tau$* is said pseudo propagation delay.

11. The method according to claim 10, wherein said calculation of said relations is based on a transmission time calculated as:
$t_{t1}$=[GPSTOW −floor {1000*($\delta t_{t1}$+$\tau$*)}]/1000+$\delta t_{t1}$
expressed in s, where $\delta t_{t1}$ is a truncated transmission time calculated according to the relation:
$\delta \rho_1$ =c ·(0.001-$\delta t_{t1}$)
where $\delta \rho_1$ is said truncated pseudorange.

12. The method according to claim 6, further comprising the step of:
the positioning node calculating said position of said mobile terminal based on said transferred GPS time stamp, said transferred truncations of said pseudoranges and said pseudo propagation delay.

13. An assistance data providing arrangement, comprising:
means for providing satellite time reference data;
said satellite time reference data comprising a relation between a frame time of a cellular communication system and a satellite reference time;
means for adapting limits of a search window to a specific satellite from which a satellite ranging signal emerges based at least on said satellite time reference data, connected to said means for providing satellite time reference data; and
means for providing said limits of said search window to a mobile terminal; said means for providing satellite time reference data in turn comprising:
means for receiving measured quantities representing said relation for a multitude of mobile terminals over time;
processor arranged for calculating an estimate of said relation from said received measured quantities representing said relation, as well as for calculating an estimated inaccuracy of said estimate of said relation;
wherein said means for adapting said search window is arranged to adapt said limits of said search window based on said estimated relation and said estimated inaccuracy of said estimated relation.

14. The arrangement according to claim 13, wherein said processor is arranged for performing Kalman filtering.

15. The arrangement according to claim 14, wherein said Kalman filtering is based on a linear trend model.

16. The arrangement according to claim 14, wherein said processor is further arranged for postprocessing estimating said inaccuracy from estimation errors of said Kalman filtering.

17. The arrangement according to claim 13, wherein said processor is arranged for estimation of said inaccuracy from a repeated differentiation of said measured quantities.

18. The arrangement according to claim 13, for application to mobile terminal assisted positioning using the global positioning system-GPS, further comprising:
means for providing GPS acquisition assistance data comprising code phase, integer code phase and the GPS bit number for a list of GPS satellites expected at a reference site;
means for transferring said GPS assistance data to a mobile terminal;
said means for receiving said measured quantities representing said relation being arranged for receiving data representing truncations of a pseudorange between a plurality of GPS satellites and said mobile terminal, and a GPS time stamp for the reception of signals from respective ones of GPS satellites in said mobile terminal;
said processor being further arranged for computing a pseudo propagation delay based on said assistance data;
whereby said processor is arranged for calculating said relations based on said pseudo propagation delay, said pseudorange and said time stamp.

19. The arrangement according to claim 18, wherein said processor is arranged for performing said computing of said pseudo propagation delay by:
determining an apparent propagation delay;
establishing said pseudo propagation delay as said apparent propagation delay if said apparent propagation delay is larger than a predetermined minimum delay and as said apparent propagation delay plus 80ms if said apparent propagation delay is smaller than said predetermined minimum delay.

20. The arrangement according to claim 19, wherein said minimum delay is selected in the interval of 7 to 58 ms.

21. The arrangement according to claim 20, wherein said minimum delay is selected in the interval of 30 to 45 ms.

22. The arrangement according to claim 19, wherein said apparent propagation delay, $\tau$, being calculated as:
$t_{t1,ref}$=GPSBN ·0.02+ICP ·0.001+(1023−CP)/ 1.023·10$^6$, CP $\neq$0
$t_{t1}$=GPSBN ·0.02+ICP ·0.001, CP =0
expressed in s, where GPSBN is the GPS bit number, ICP is the integer code phase and CP is the code phase for said first of said plurality of satellites.

23. The arrangement according to claim 22, wherein said calculation of said relations is based on a transmission time calculated as:
$t_{t1}$=[GPSTOW −floor {1000*($\delta t_{t1}$+$\tau$*)}]/1000+$\delta t_{t1}$
expressed in s, where $\delta t_{t1}$ is a truncated transmission time calculated according to the relation:
$\delta \rho_1$−c·(0.001−$\delta t_{t1}$)
where $\delta \rho_1$ is said truncated pseudorange, GPSTOW$_{sv1}$ is said GPS time stamp and $\tau$* is said pseudo propagation delay.

24. Cellular communication system node comprising an arrangement according to claim 13.

25. The cellular communication system node according to claim 24, wherein said cellular communication system node being a radio network controller—RNC—or a serving mobile location centre—SMLC.

* * * * *

UNITED STATES PATENT AND TRADEMARK OFFICE
CERTIFICATE OF CORRECTION

PATENT NO. : 8,289,206 B2  
APPLICATION NO. : 12/279807  
DATED : October 16, 2012  
INVENTOR(S) : Wigren et al.

Page 1 of 1

It is certified that error appears in the above-identified patent and that said Letters Patent is hereby corrected as shown below:

IN THE SPECIFICATIONS:

In Column 13, Line 15, delete "$\tau$always" and insert -- $\tau$ always --, therefor.

IN THE CLAIMS:

In Column 16, Line 11, in Claim 1, delete "relation;" and insert -- relation; and, --, therefor.

In Column 18, Line 45, in Claim 22, delete "$t_{t1}$=" and insert -- $t_{t1,ref}$= --, therefor.

In Column 18, Line 55, in Claim 23, delete "$\delta\rho_1$-c" and insert -- $\delta\rho_1$=c --, therefor.

Signed and Sealed this  
Fifth Day of March, 2013

Teresa Stanek Rea  
*Acting Director of the United States Patent and Trademark Office*